United States Patent [19]
Rankin

[11] 4,058,142
[45] Nov. 15, 1977

[54] PIPELINE FITTING

[75] Inventor: William J. Rankin, Tulsa, Okla.

[73] Assignee: T. D. Williamson, Inc., Tulsa, Okla.

[21] Appl. No.: 683,059

[22] Filed: May 4, 1976

[51] Int. Cl.² ............................................. F16L 55/10
[52] U.S. Cl. ..................................................... 138/89
[58] Field of Search ..................................... 138/89, 94

[56] References Cited
U.S. PATENT DOCUMENTS

| 3,070,129 | 12/1962 | Poulallion et al. | 138/89 |
| 3,155,116 | 11/1964 | Vernooy | 138/89 |
| 3,329,447 | 7/1967 | Hitz | 138/89 |

Primary Examiner—Robert I. Smith

[57] ABSTRACT

A side outlet fitting is provided for a pipeline wherein the fitting includes a tubular member which can be welded onto the pipeline. It also includes an adapter which can be flush bolted to the fitting while at the same time providing a circle of bolt holes for receiving the studs of a standard tapping valve.

4 Claims, 2 Drawing Figures

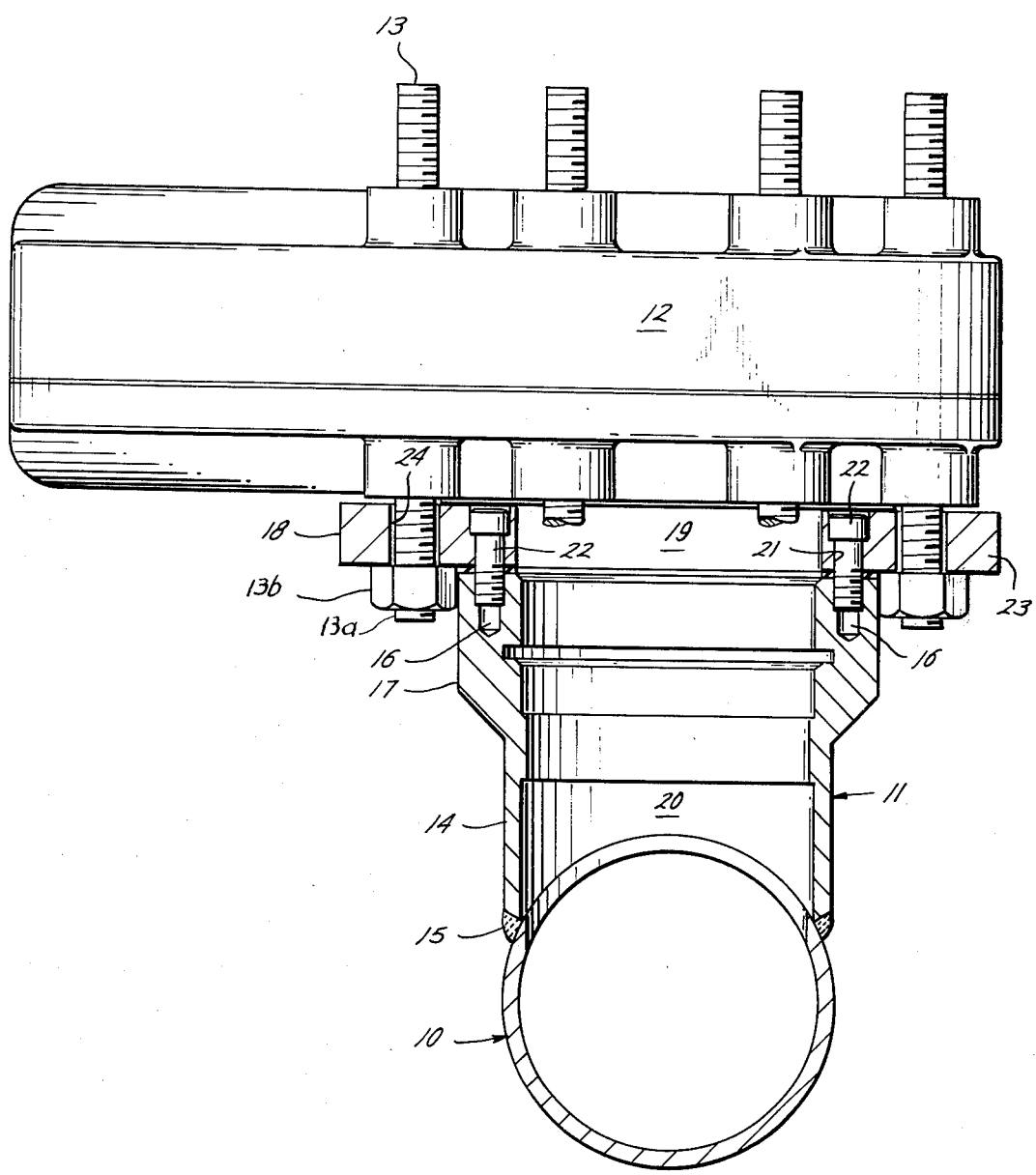

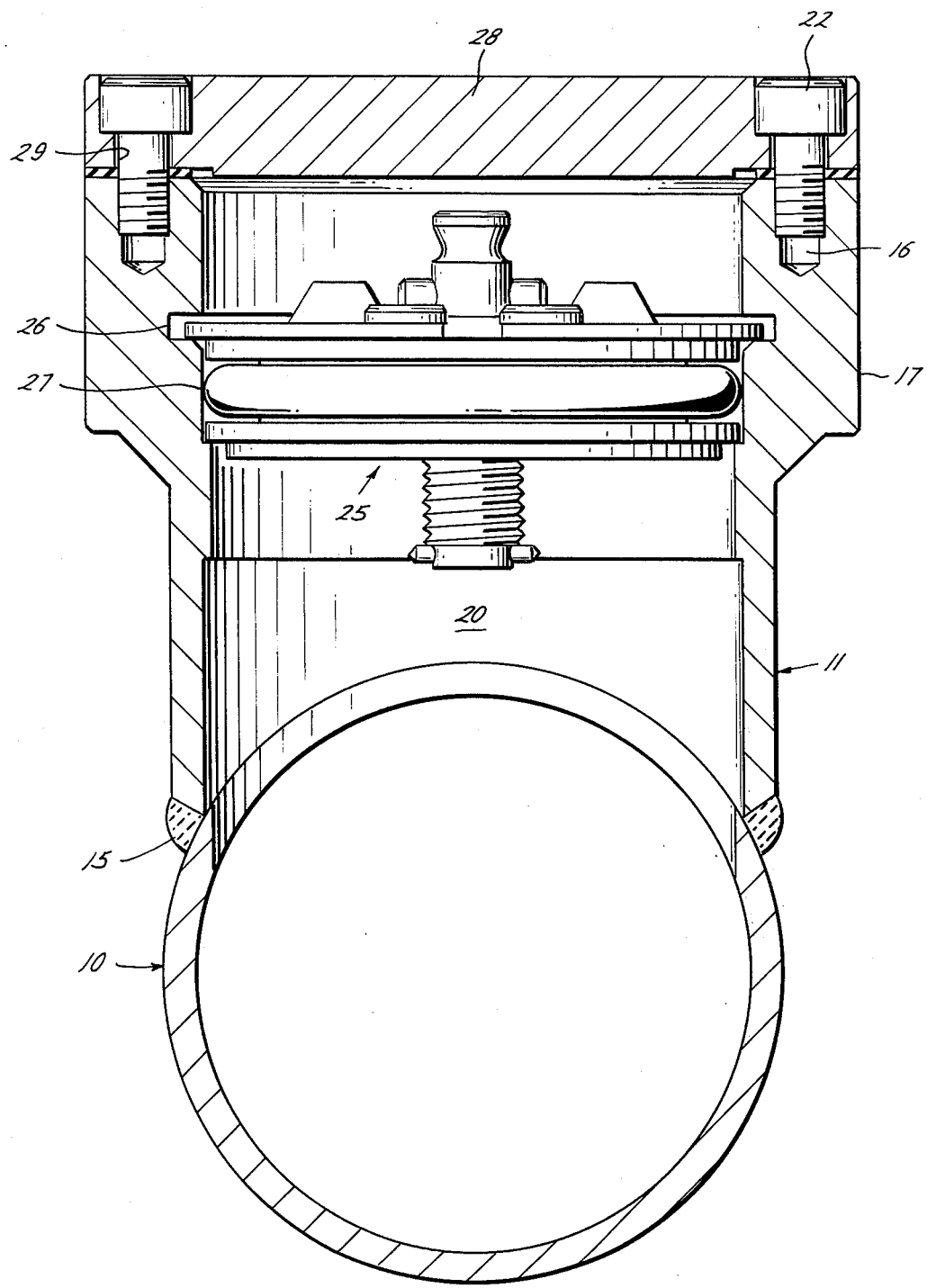

PIPELINE FITTING

This invention relates to side outlet fittings for pipelines which fittings are of the type that can be connected to a pipeline to support and cooperate with conventional hot tapping equipment and ultimately to receive a plug to seal off the side outlet after the hot tapping and other operations have been completed.

Pipeline fittings of the type to which this invention is related are used in hot tapping operations on a pipeline. In the first step of these operations, the fitting is welded to the pipeline at the point where the tap is to be made. Thereafter, a tapping valve and a tapping machine are mounted on the fitting and the tap completed. Then the tapping machine is removed leaving the tapping valve on the fitting to prevent escape of pipeline fluid. Usually a plugging machine is then mounted on the tapping valve and a temporary plug is seated in the pipeline to prevent flow therethrough during remedial operations on the pipeline. After the repairs have been completed, the temporary plug is removed from the line and a permanent plug is landed in the fitting to block flow therefrom so that the tapping valve can be removed. Finally, a blind flange is connected to the fitting.

One fitting suitable for use in the foregoing operations is disclosed in VerNooy U.S. Pat. No. 3,155,116, particularly in FIG. 9 thereof. This fitting affords a standard bolted flange connection between it and the tapping machine or other equipment to be attached to the fitting, including a blind flange. While this particular fitting has found extensive use, the standard bolted flange on it has presented some problems. For example, the protruding flanges and bolt heads can be snagged by a backhoe when a pipeline having such a fitting thereon is being uncovered. Also, the flanges and bolt heads make the fitting more difficult to wrap and coat and, of course, are relatively expensive.

It is an object of this invention to provide a pipeline fitting of the type described above which does not have protruding flanges or bolt heads and is of a relatively streamlined design.

Another object is to provide such a fitting which includes an adapter having a flangeless connection with a tubular member and a flanged type fitting so that flange connections to certain equipment, such as hot tapping machines, can be readily made and yet when the operation is concluded, the fitting can be converted to a flangeless fitting.

Other advantages and features of the invention will be apparent to one skilled in the art upon consideration of the specification, the claims, and the drawings wherein:

FIG. 1 is an elevational view, partially in section, of a preferred embodiment of a flangeless fitting of this invention which includes a flange adapter;

FIG. 2 shows a fitting like FIG. 1 with the tapping equipment removed and a sealing plug landed in place and a blind plate installed.

Referring to FIG. 1 there is shown a pipeline 10 having a fitting 11 welded thereto. Attached to the fitting is a tapping valve 12 to which various mechanisms can be attached by flange studs 13. Among such mechanisms are hot tapping machines, plugging machines, etc.

Fitting 11 comprises a tubular member 14 having one end 15 adapted to be welded onto a pipeline to surround an opening therein. Thus, the end of 15 of the fitting is welded onto a pipeline and then a hot tap is made in the pipeline which is the opening referred to above. The other end of the tubular member is provided with a plurality of threaded holes 16 extending longitudinally thereinto with the holes terminating within the tubular member. The holes are preferably arranged in a bolt circle. The upper end of the housing can be radially thickened as at 17 for added strength.

Adapter plate 18 which is preferably circular, is provided and has a central opening 19 in alignment with the opening 20 through the tubular member 14. Central opening 19 should be of substantially the same size as opening 20. This permits cutting tools, plugs, and the like to be passed through the tapping valve 12, adapter 18 and into fitting 11 and, in some cases, hence on into the pipeline.

Adapter 18 is provided with a plurality of unthreaded holes 21 in respective register with the threaded holes 16 in the tubular member 14. The holes 21 are counterbored at their upper ends as shown so that each can receive a capscrew 22 with its head flush with or below the upper surface of adapter 18. With this arrangement, it can be seen that the tapping valve 12 can be mounted on the adapter plate without interference from the capscrews.

Adapter 18 is provided with an annular portion 23 which extends radially outwardly of tubular member 14. In this annular portion, a plurality of bolt holes 24 are provided in a bolt circle to match that of studs 13a carried by valve 12. The radius of the bolt circle of bolt holes 24 is made sufficiently greater than the radius of the bolt circle of capscrews 22 that nuts 13b can be screwed on the studs without interference with the tubular member.

After the various tapping, plugging and other operations have been completed, it is desirable to recover tapping valve 12 from the fitting. To permit this, a plug 25 is passed by a suitable mechanism through the tapping valve and locked in place in the tubular fitting. Plug 25 is preferably constructed as shown in the aforesaid VerNooy patent and reference is made thereto for a fuller disclosure of the plug. The fitting 11 provides an annular locking groove 26 in its internal wall for locking plug 25 in place. The internal wall also has an annular sealing surface 27 for sealingly engaging the seal member carried by the plug.

After the plug 25 has been landed and locked in place, the tapping valve can be safely removed without escape of fluid from the pipeline. Thereafter, a closing plate or disc 28 is connected to the upper end of the tubular portion 11. Thus, the disc has a plurality of unthreaded holes 29 about its periphery in register with the threaded holes 16 in the tubular member. Again capscrews 22 are used with their heads in a counterbore in each of holes 29. With this arrangement it will be seen that all protruding flanges and bolt heads as exist in a standard flange have been eliminated. The structure shown in FIG. 2 is thus more easily coated and wrapped than the standard flanged fitting and does not present any flanges or bolt heads on which a backhoe or other equipment can be engaged to cause damage to the pipeline.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A side outlet fitting for a pipeline comprising a tubular member having one end adapted to be attached to a pipeline to surround an opening therein and having another end with a plurality of threaded holes extending longitudinally thereinto with the holes terminating within said another end, said holes being arranged in a bolt circle of a first radius; an adapter plate extending across said another end and having (i) a central opening in alignment with the opening through the tubular member and of substantially the same size, (ii) unthreaded holes therethrough in respective register with said threaded holes and each having a counterbored portion, (iii) an annular portion extending radially outwardly of the tubular member and (iv) a plurality of bolt holes through the annular portion with the bolt holes being arranged in a bolt circle of a second radius which is sufficiently larger than the first radius so that nuts can be screwed onto bolts extending through said bolt holes without interference with said tubular housing; and a capscrew threaded into each of said holes with its head within said counterbored portion.

2. The fitting of claim 1 wherein said adapter plate is circular.

3. The fitting of claim 1 wherein said tubular member has an annular locking groove in its internal wall for locking a plug in the tubular member and also has an annular sealing surface on its internal wall for sealingly engaging a seal member carried by said plug.

4. The fitting of claim 3 wherein said sealing surface is intermediate of said locking groove and said another end of the tubular member.

* * * * *